United States Patent
Okamoto

(10) Patent No.: US 6,710,326 B2
(45) Date of Patent: Mar. 23, 2004

(54) PHOTOELECTRIC SENSOR HAVING SPECIAL DISPLAY FEATURES

(75) Inventor: Yasuhiro Okamoto, Osaka (JP)

(73) Assignee: Keyence Corporation, Osaka (JP)

( * ) Notice: Subject to any disclaimer, the term of this patent is extended or adjusted under 35 U.S.C. 154(b) by 0 days.

(21) Appl. No.: 10/387,538

(22) Filed: Mar. 14, 2003

(65) Prior Publication Data

US 2003/0150981 A1 Aug. 14, 2003

Related U.S. Application Data

(63) Continuation of application No. 09/773,669, filed on Feb. 2, 2001, now Pat. No. 6,555,806.

(51) Int. Cl.$^7$ ................................................ G06M 7/00
(52) U.S. Cl. .................................. 250/221; 250/214 R
(58) Field of Search ........................ 250/221, 222.1, 250/239, 214 VT, 214 R; 340/691.6; 356/27, 623

(56) References Cited

U.S. PATENT DOCUMENTS

| | | | |
|---|---|---|---|
| 4,690,001 A | * | 9/1987 | Harvey et al. ................ 73/800 |
| 5,008,548 A | | 4/1991 | Gat |
| 5,281,810 A | * | 1/1994 | Fooks et al. ............. 250/222.1 |
| 5,324,931 A | * | 6/1994 | Fooks et al. ............. 250/222.1 |
| 5,336,882 A | * | 8/1994 | Fooks et al. ................ 250/221 |
| 5,347,117 A | | 9/1994 | Fooks et al. |
| 5,712,477 A | | 1/1998 | Delaney, III et al. |
| 5,783,816 A | | 7/1998 | McPherson |
| 5,808,296 A | | 9/1998 | McMonagle et al. |
| 5,969,340 A | * | 10/1999 | Dragne et al. .......... 250/223 R |
| 6,011,467 A | | 1/2000 | Kamei et al. |
| 6,094,272 A | * | 7/2000 | Okamoto ................... 356/402 |
| 6,211,784 B1 | | 4/2001 | Nishide |
| 6,555,806 B2 | * | 4/2003 | Okamoto ................... 250/221 |

FOREIGN PATENT DOCUMENTS

| | | | |
|---|---|---|---|
| EP | 0605252 A1 | * | 7/1994 |
| EP | 797 107 A | | 9/1997 |
| JP | 9-252242 A | | 9/1997 |

* cited by examiner

Primary Examiner—Que T. Le
Assistant Examiner—Eric J Spears
(74) Attorney, Agent, or Firm—Smith Patent Office

(57) ABSTRACT

A photoelectric sensor is disclosed that comprises a sensor unit having a casing. The casing includes one surface having a first display and a second display. The first display is structured and arranged to display a threshold value that may be set by an operator of the photoelectric sensor. The second display is structured and arranged to display the actual conditions sensed by said photoelectric sensor. The sensor also includes a selection device for selecting different operational values to display on the second display. The selection device can include a mechanism disposed on the casing for changing the different operational values on the second display. The selection device can also include an adjustment switch disposed on the casing. The adjustment switch allows the operator to adjust the threshold value shown on the first display while the second display shows at least one of the actual conditions sensed by the photoelectric sensor. The photoelectric sensor can be an integrated sensor or can include at least two parts, namely a sensor head and a main body unit. The sensor also can have a plurality of different display setting modes that can be shown on the displays and an operator may set these modes. These different modes include a power setting mode, a hold setting mode and a timer setting mode, each of which can have a plurality of displayable conditions.

17 Claims, 15 Drawing Sheets

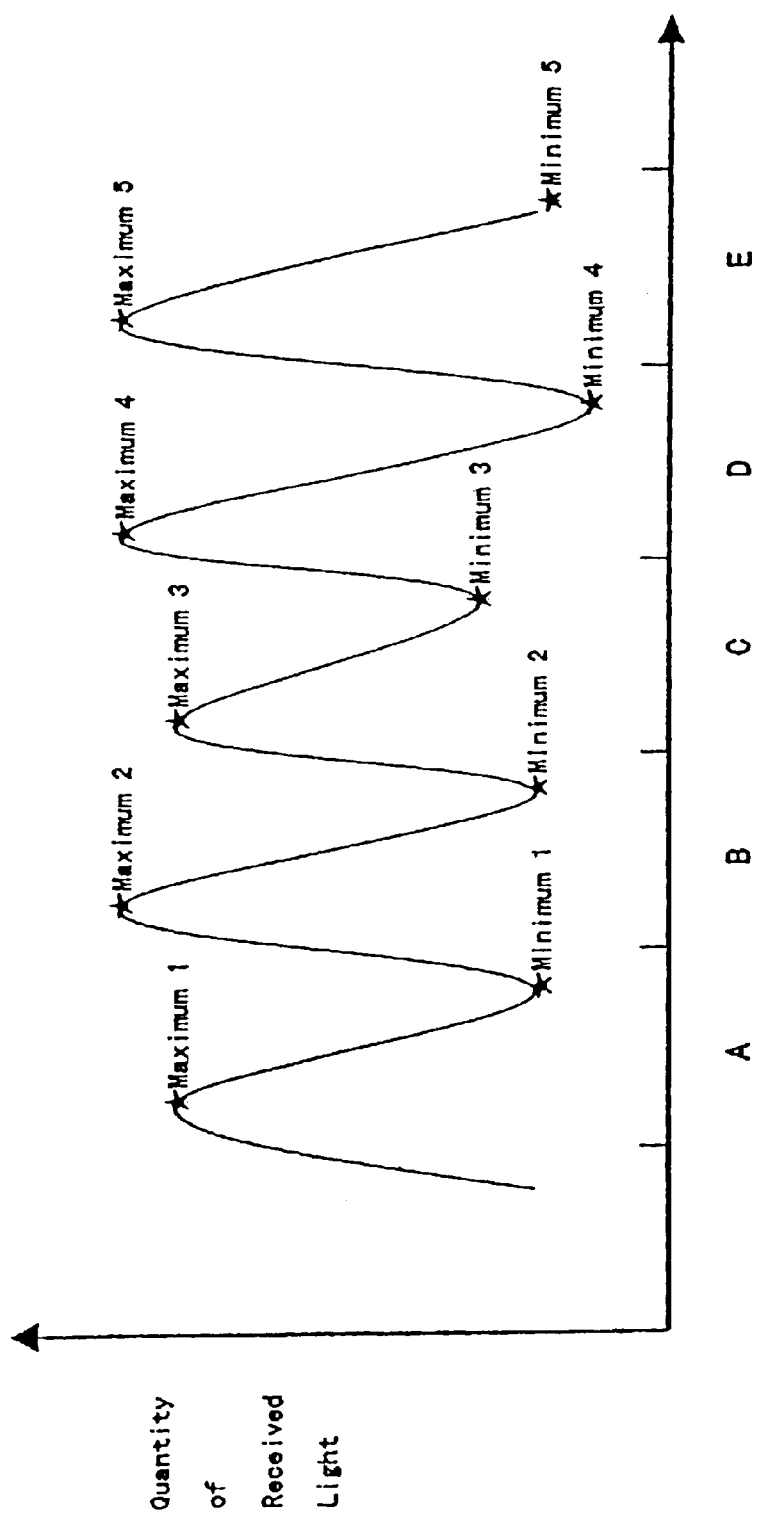

PHOTOELECTRIC SENSOR HAVING SPECIAL DISPLAY FEATURES

CROSS REFERENCE TO RELATED APPLICATIONS

This application is a continuation of U.S. patent application Ser. No. 09/773,669 filed on Feb. 2, 2001, now U.S. Pat. No. 6,555,806.

BACKGROUND OF THE INVENTION

1. Field of the Invention

The present invention relates to a photoelectric sensor having a specialized display.

2. Discussion of the Related Art

Photoelectric sensors are typically used for detecting objects. They compare a measured quantity, such as reflected light, with a threshold value to determine whether the object is present or not.

These sensors have a display that can indicate the value of the measured quantity or simply indicate whether the object is present or not. Some sensors include a display that can show the value of the measured quantity and this display can be switched to also show the threshold value. Before the present invention, it was difficult for the operator to easily compare a selected measured quantity with the threshold value since the threshold value was not displayed when the operator selected the display to show a selected measured quantity. Thus, it was difficult for the operator to easily adjust the threshold value based on the real situation that the photoelectric sensor was experiencing. This situation has caused difficulties for the operator because they were required to switch back and forth between displaying the selected measured value and the threshold value.

SUMMARY OF THE INVENTION

An object of the invention is to provide a photoelectric sensor that can simultaneously display multiple parameters related to the sensing conditions.

A further object of the invention is to provide a photoelectric sensor that allows easy adjustment of a threshold value.

In one aspect of the invention, there is provided a photoelectric sensor comprising a sensor unit having a casing, the casing including one surface having a first display and a second display. The first display is structured and arranged to display a threshold value that may be set by an operator of the photoelectric sensor. Further, the second display is structured and arranged to display actual conditions sensed by said photoelectric sensor. The sensor also includes a selection device for selecting different operational values to display on the second display. The selection device includes a mechanism disposed on the casing for changing the different operational values on the second display.

In a second aspect of the invention, there is provided a photoelectric sensor comprising a sensor unit having a casing including one surface that has a first display and a second display. The first display is structured and arranged to display a threshold value that may be set by an operator of the photoelectric sensor and the second display is structured and arranged to display actual conditions sensed by the photoelectric sensor. An adjustment switch is also disposed on the casing. The adjustment switch allows for adjustment of the threshold value shown on the first display while the second display shows at least one of the actual conditions sensed by the photoelectric sensor.

In a third aspect of the invention, there is provided a photoelectric sensor comprising a main body unit and a sensor head unit connected by at least one cable. At least one of the main body unit and the sensor head unit includes a casing including one surface that has a first display and a second display. The first display is structured and arranged to display a property set by an operator of the photoelectric sensor and the second display is structured and arranged to display actual conditions sensed by said photoelectric sensor. A selection device is also provided for selecting different operational values to display on the second display. The selection device can include a mechanism like a mode selection switch disposed on the casing for changing the different operational values shown on the second display. Methods of operating the photoelectric sensor are also disclosed herein.

BRIEF DESCRIPTION OF THE DRAWINGS

The above objects and features of the present invention will be apparent to those skilled in the art from the following description of the preferred embodiments thereof when considered in conjunction with the appended drawings in which:

FIG. 8 is a graph of time versus the quantity of received light used to explain a principle of the hold mode.

FIG. 12A shows when the level LV of the positioning signal is equal to or higher than a predetermined threshold value TH. FIG. 12B shows when the level LV of the positioning signal is lower than the value TH.

DETAILED DESCRIPTION OF THE PREFERRED EMBODIMENTS

Embodiments of the present invention are described in further detail with reference to the accompanying drawings.

Figure 1:
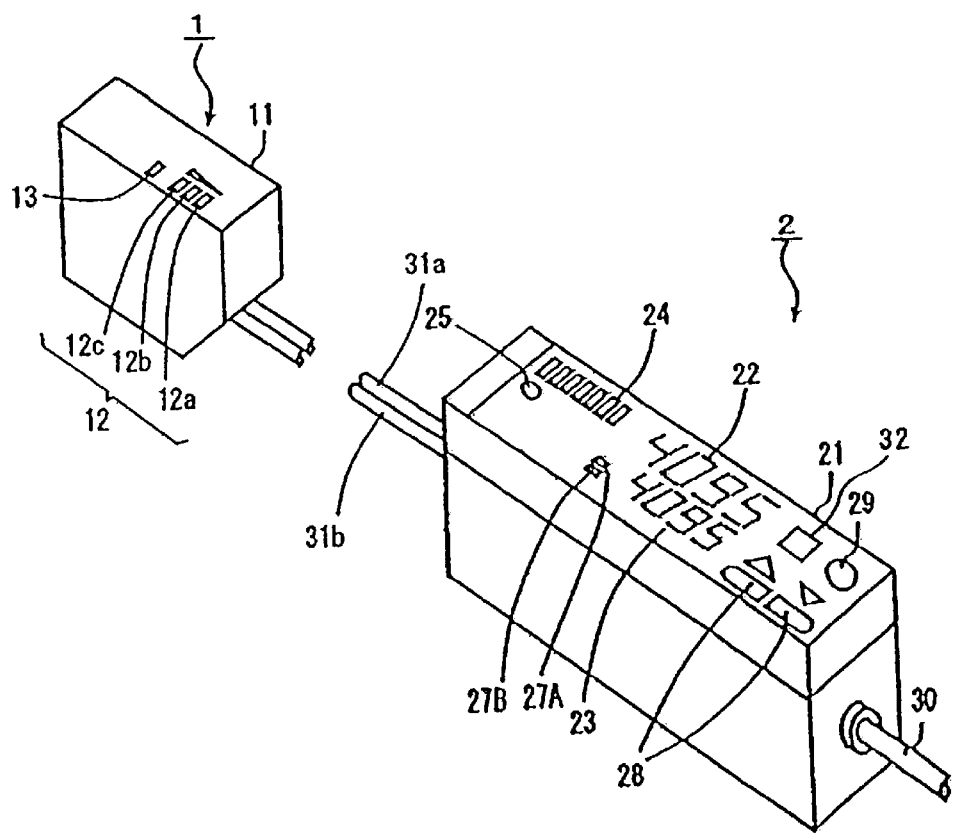
FIG. 1 is a perspective view of a photoelectric sensor comprising a sensor head unit and an amplifier unit in accordance with a first embodiment of the present invention.

FIG. 1 is a perspective view of a reflective type photoelectric sensor comprising a sensor head unit 1 and an amplifier unit 2 in accordance with a first embodiment of the present invention.

As shown in FIG. 1, the sensor comprises a sensor head unit 1 and a main body unit 2 including an amplifier. The head unit 1 is connected to the main body unit 2 by using cables 31a and 31b.

An emitting portion that emits a laser beam to an object to be detected and a beam receiving portion that receives a reflected beam from the detected object are both installed in a casing 11 of the sensor head unit 1.

The upper surface of the casing 11 has a detection ratio display portion 12 comprising a bar type display and a laser emission indicator 13. The detection ratio means the ratio of the quantity-of-received-light with respect to a threshold value. In other words, the detection ratio indicates a relative quantity (margin) of light received with respect to the threshold.

The display portion 12 comprises three LEDs (Laser Emission Diodes) 12a, 12b and 12c for indicating the detection ratio that will be described hereinafter.

The laser emission indicator 13 indicates whether or not the laser diode of the emitting portion is turned on.

An upper surface of a casing 21 of the main body unit 2 has a first display portion 23, a second display portion 22, a bar LED monitor 24, a laser emission indicator 25, hold mode indicators 27A and 27B, an adjustment switch 28, a setting switch 29 and a display select or mode switch 32.

The hold mode indicator 27A is turned on when one hold mode is set so as to hold a maximum value corresponding to the quantity of received light or corresponding to the detection ratio during a predetermined period by a mode selection operation that will be described later.

On the other hand, the hold mode indicator 27B is turned on when another hold mode is set for holding a minimum value corresponding to the quantity of received light or corresponding to the detection ratio during a predetermined period by the mode selection operation.

The second display portion 22 comprises four digit number display portions each of which comprises a seven segment LED and displays numerals indicating the quantity of received light that is received from the laser receiving portion of the head unit 1.

The display select switch 32 can cyclically change the numerals corresponding to the quantity of received light displayed on the second display portion 22 to other numerals. These display options include indicating a detection ratio of the quantity of received light with respect to the threshold value and the value corresponding to the maximum value or the minimum value of the quantity of the received light as well as a relative value corresponding to the maximum value or the minimum value with respect to the threshold value.

The first display portion 23 also comprises four digit number display portions each of which comprises a seven segment LED to numerically display the threshold value.

The adjustment switch 28 is used to adjust the threshold value displayed on the first display portion 23. The setting switch 29 is used to set the threshold value.

The setting switch 29 is initially pushed when the detected object is disposed in a predetermined detectable area and the setting switch 29 is pushed again when the detected object is not disposed in the predetermined detectable area. The threshold value is then set automatically to an intermediate value between the value of the quantity of received light with the object in the predetermined detectable area and the value of the quantity of received light without the object in the predetermined detectable area.

Namely, the threshold value becomes one criteria to detect the object disposed in the predetermined detectable area. The set threshold value can then be displayed on the first display portion 23.

After the threshold value displayed on the first display portion 23 is adjusted by using the adjustment switch 28, the adjusted threshold value is set as a renewed threshold value.

The second display portion 22 numerically displays the quantity of received light input to the head unit 1. On the other hand, the first display portion 23 numerically displays a set value like the threshold value that is calculated in the main body unit 2 and is compared with the quantity of received light.

The bar LED monitor 24 displays the current value of received light intensity relative to the setting value within a range, typically −15% to +15%.

The side surface of the casing 21 of the main body unit 2 is connected to an output cable 30. The output cable 30 outputs a detection signal indicating the detected result corresponding to a confirmation of the detected object's existence within the detectable area.

Figure 2:
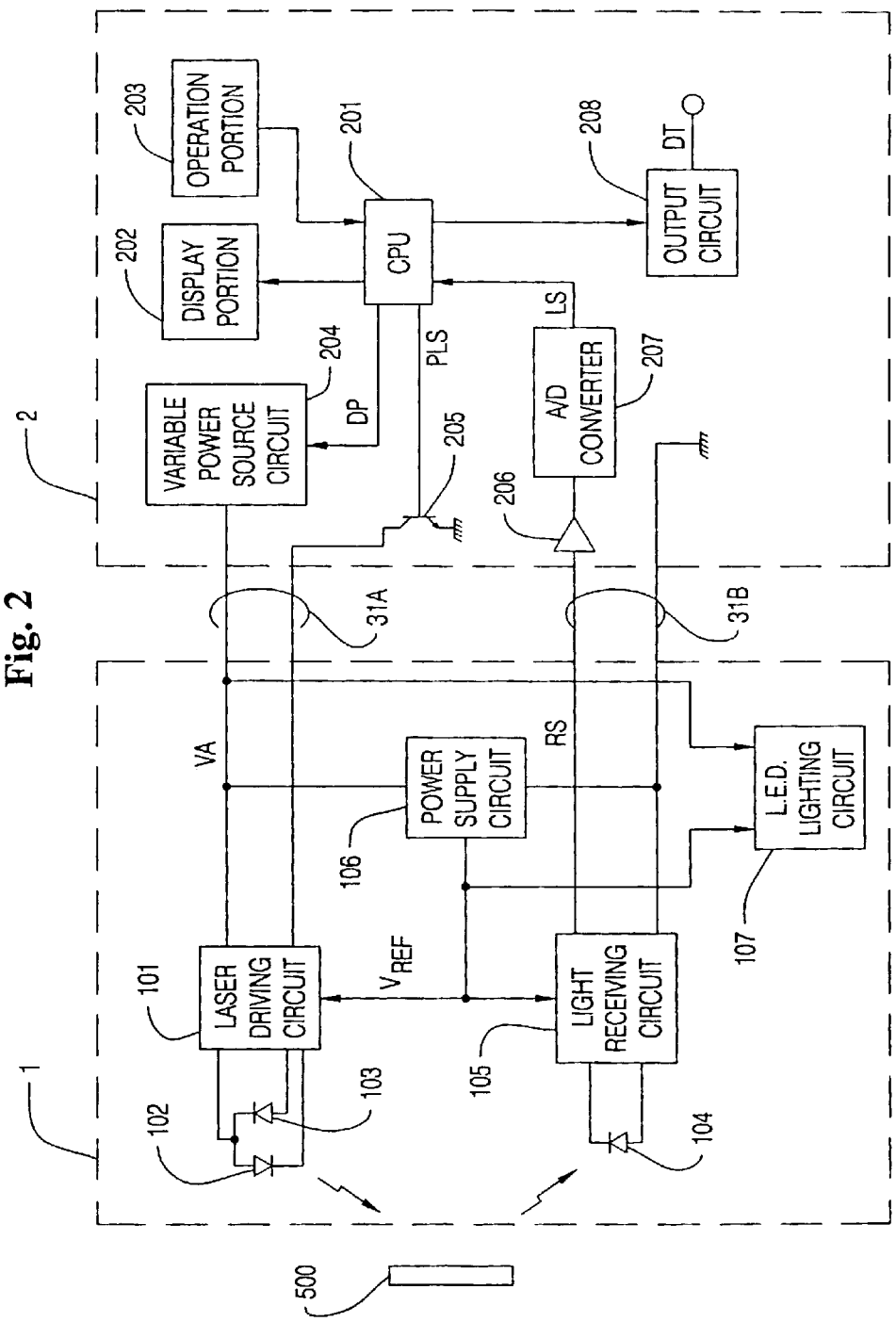
FIG. 2 is a block diagram showing the structure of the photoelectric sensor according to the first embodiment of the present invention.

FIG. 2 is a block diagram showing the structure of the photoelectric sensor according to the first embodiment of the present invention. Further, FIG. 3 is a graph explaining the process of determining the existence of the object using the received light signal and the threshold value.

The head unit 1 has a laser driving circuit 101, a laser diode 102, a photo-diode for monitoring 103, a photo-diode 104, a light receiving circuit 105, a power supply circuit 106 and a LED lighting circuit 107. The LED lighting circuit 107 includes the detection ratio display portion 12. The main body unit 2 has a CPU 201, a display portion 202, an operation portion 203, a variable power source circuit 204, a transistor 205, an amplifier 206, an A/D converter 207 and an output circuit 208.

The display portion 202 has the first display portion 23, the second display portion 22, the bar LED monitor 24, the laser emission indicator 25 and the hold mode indicators 27A and 28B. The operation portion 203 has the adjustment switch 28, the setting switch 29 and the display select switch 32.

The CPU 201 of the main body unit 2 provides a pulse signal PLS to a base terminal of the transistor 205 to control the lighting of the diode 102.

The transistor 205 is turned on and off corresponding to the pulse signal PLS.

The collector terminal of the transistor 205 is connected to the laser driving circuit 101 of the head unit 1 by way of the cable 31a.

Thus, the laser driving circuit 101 drives the laser diode 102 corresponding to the pulse signal PLS output from the CPU 201. When the laser diode 102 is turned on, the laser beam is emitted to the predetermined detectable area. The photo-diode for monitoring 103 is used to monitor the laser beam quantity emitted from the laser diode 102.

When an object 500 to be detected is in the predetermined detectable area, the photo-diode 104 receives the reflected light from the object. The light receiving circuit 105 outputs an analog light-receiving signal RS corresponding to the quantity of light received by the photo-diode 104.

The signal RS that is output from the light receiving circuit 105 is provided to the main body unit 2 by way of the cable 31b. The amplifier 206 of the main body unit 2 amplifies the signal RS output from the light receiving circuit 105 and provides the amplified signal to the A/D converter 207. The A/D converter 207 converts the amplified signal RS from an analog signal to a digital signal and provides the digital signal LS to the CPU 201. The CPU 201 determines whether the object 500 is in the predetermined area or not based on a comparison of the level of the signal LS provided by the A/D converter 207 with the threshold value TH. The output circuit 208 then outputs a determination signal DT indicating the results of the determination to the output cable 30.

The CPU 201 has the threshold value TH set by using the aforementioned method along with the setting switch 29 of the operation portion 203. When it is necessary to adjust the threshold value TH, this is carried out by operation of the adjustment switch 28.

When an operator adjusts the threshold value TH, the operator can adjust the threshold value displayed numerically on the first display portion 23 which is read out from the CPU 201 by using up and down buttons of the adjustment switch 28 to increment or decrement the displayed threshold value TH on the first display portion 23 to a desired value. The operator can also look at the quantity of received light or the detection ratio displayed on the second display portion 22 at the same time.

In other words, since the operator can adjust the threshold value TH while looking at the current quantity of received light, the operator can easily adjust the desirable threshold value.

Further, the threshold value TH memorized in the CPU 201 is also changed prior to changing the displayed numerals of the first display portion 23. Furthermore, the CPU 201 always manages the adjustment function of the adjustment switch 28.

Since there is a possibility for the threshold value to be changed by improper operation of the adjustment switch 28 due to an unintended operator's activity, the photoelectric sensor has a key-lock function to lock the adjustment switch 28.

In detail, pushing the select switch 32 and the adjustment switch 28 at the same time for three seconds and more carries out the lock setting of the key-lock function.

Further, the key-lock function can also be designed to lock other switches of the operation portion 203.

To release the key-lock function, one uses the same operation mentioned above.

Figure 3A:
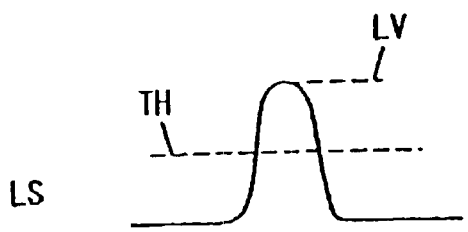
FIG. 3A is a graph used to explain the process of determining a received light signal and a threshold value.
Figure 3B:
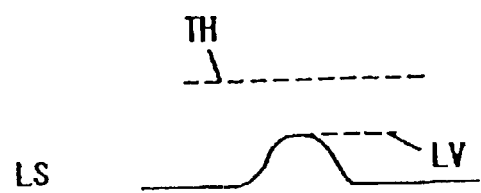
FIG. 3B is an additional graph used to explain the process of determining a received light signal and a threshold value.

FIGS. 3A and 3B are graphs explaining the process of determining the existence of the object using the received light signal and the threshold value. As shown in FIG. 3A, when the level LV of the receiving light signal LS is higher than the threshold value TH, it is determined that the object 500 is within the detectable area. On the other hand, as shown in FIG. 3B, when the level LV of the receiving light signal LS is lower than the threshold value TH, it is determined that the object 500 is not within the detectable area.

When the display select switch 32 of the operation portion 203 is pushed, the CPU 201 calculates the ratio of the level LV corresponding to the quantity of received light with respect to the threshold value TH and outputs the result of the calculation to the second display portion 22 to display the ratio on the second display portion 22.

In the case shown in FIG. 3A, the detection ratio is displayed as a number which is larger than "1". In the other case shown in FIG. 3B, the detection ratio is displayed as a number which is smaller than "1". Further, the detection ratio can be displayed as a percentage based on the threshold value being 100%. The CPU 201 provides a control signal DP corresponding to the calculated detection ratio to the variable power circuit 204.

The variable power supply circuit 204 provides a variable voltage VA corresponding to the control signal DP to the head unit 1 through the cable 31a.

When the detection ratio is larger, the level of the variable voltage VA is lower. On the other hand, when the detection ratio is lower, the level of the variable voltage VA is higher. Namely, the level of the variable voltage VA expresses a function of the detection ratio.

This variable voltage VA is provided to the laser driving circuit 101, the fixed power supply circuit 106 and the LED lighting circuit 107.

The fixed power supply circuit 106 receives the variable voltage VA and provides a fixed standard voltage Vref to the laser driving circuit 101, the light receiving circuit 105 and the LED lighting circuit 107.

Further, the laser driving circuit 101 controls the light quantity to the laser diode 102 as a fixed quantity based on the current through the photo-diode for monitoring 103 in spite of the level of the variable voltage VA.

The LED lighting circuit 107 turns on and off the various detection ratio display LEDs 12a, 12b and 12c corresponding to the level of the variable voltage VA.

Figure 4:
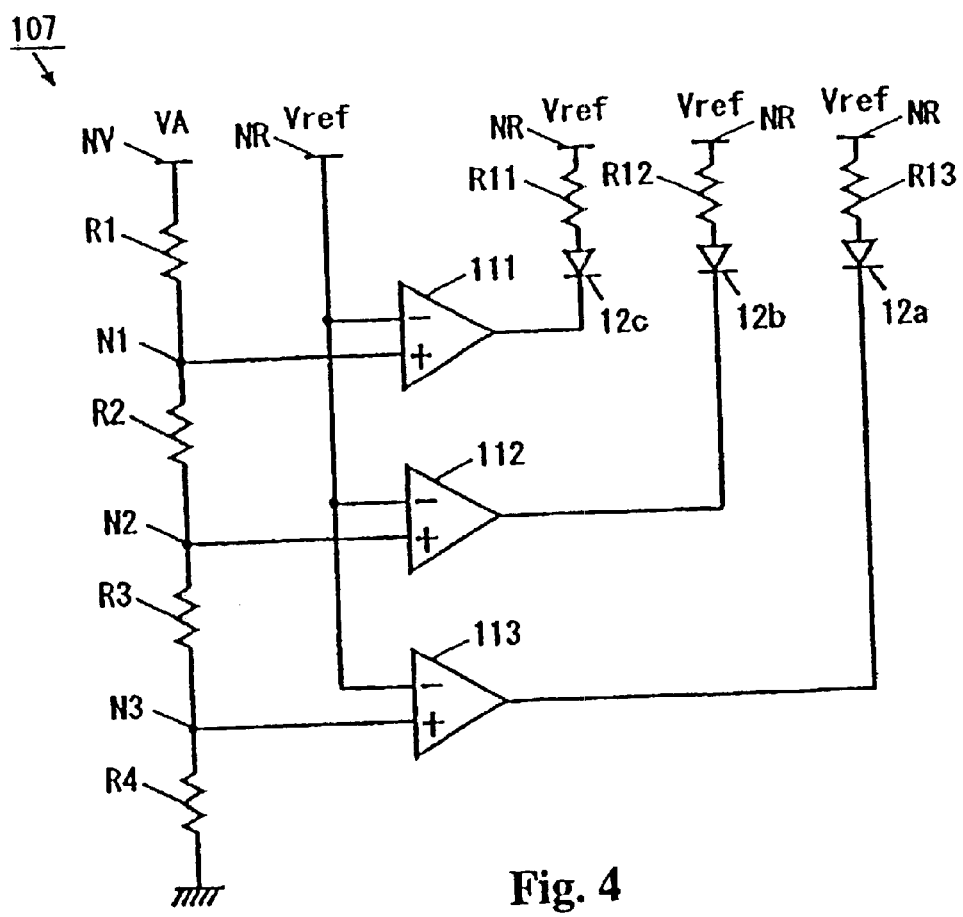
FIG. 4 is a schematic drawing of a circuit of an LED lighting circuit.

FIG. 4 is a schematic drawing of the LED lighting circuit 107.

As shown in FIG. 4, the LED light circuit 107 has resistors R1, R2, R3, R4, R11, R12 and R13, comparators 111, 112 and 113 and detection ratio display LEDs 12a, 12b and 12c.

The resistors R1, R2, R3 and R4 are disposed in a row between a power supply terminal NV receiving the variable voltage VA and a grounding terminal.

One input terminal of the comparator 111 is connected to a node N1 disposed between the resistors R1 and R2. One input terminal of the comparator 112 is connected to a node N2 disposed between the resistors R2 and R3. One input terminal of the comparator 113 is connected to a node N3 disposed between the resistances R3 and R4.

The other input terminals of the comparators 111, 112 and 113 are connected to a power supply terminal NR, respectively.

The output terminal of the comparator 111 is connected to the power supply terminal NR by way of the detection ratio display LED 12c and the resistor R11, the output terminal of the comparator 112 is connected to the power supply terminal NR by way of the detection ratio display LED 12b and the resistor R12 and the output terminal of the comparator 113 is connected to the power supply terminal NR by way of the detection ratio display LED 12a and the resistor R13.

Each of the comparators 111, 112 and 113 compares each electrical potential at the nodes N1, N2 and N3 with the standard voltage Vref.

When the variable voltage VA becomes lower than a first level this means it is at the lowest level and all the electrical potential of the nodes N1, N2 and N3 becomes lower than the standard voltage Vref. Thus the output signals of the comparators 111, 112 and 113 become low-level signals.

As a result, the current through the detection ratio display LEDs 12a, 12b and 12c is turned on.

When the variable voltage VA is positioned between the first level and a second level, where the second level is higher than the first level, this means it is at a second lower level and the electrical potential of the nodes N2 and N3 becomes lower than the standard voltage Vref. Thus the output signals of the comparators 112 and 113 become low-level signals.

As a result, the current is through the detection ratio display LEDs 12a and 12b and the detection ratio display LEDs 12a and 12b are turned on.

When the variable voltage VA is positioned between the second level and a third level, which is higher than the first and second levels, this means it is at a third lower level and the electrical potential of the node N3 becomes lower than the standard voltage Vref. Thus the output signal of the comparator 113 becomes a low-level signal.

As a result, the current is through the detection ratio display LED 12a and the detection ratio display LED 12a is turned on.

When the variable voltage VA becomes higher than the third lower level this means it is at the highest level and all electrical potential of the nodes N1, N2 and N3 become higher than the standard voltage Vref. This means that the electrical potential of the node N3becomes higher than the standard voltage Vref, and then all of the output signals of the comparators 111, 112 and 113 become high-level signals.

As a result, the detection ratio display LEDs 12a, 12b and 12c are not turned on.

Thus, for example, when the value of the detection ratio is equal to or higher than (110%), all of the three detection ratio display LEDs 12a, 12b and 12c are turned on.

When the value of the detection ratio is equal to or higher than 1 (100%), two detection ratio display LEDs 12a and 12b are turned on. When the value of the detection ratio is equal to or higher than 0.9 (90%) and lower than 1 (100%), the detection ratio display LED 12a is turned on.

When the value of the detection ratio is lower than 0.9 (90%), none of the detection ratio display LEDs 12a, 12b and 12c are turned on.

Especially, when the detection ratio is higher than 1.1 (110%) and all of the display LEDs 12a, 12b and 12c are turned on, the variable voltage VA is the lowest. Therefore, when the sensor has a stable condition, especially when the set threshold value is at the stable detecting position, the thermal energy made by the head unit 1 can be restricted. Thus, this also prevents a decline in performance of the laser diode 102 due to heat generated by the head unit 1.

Figure 5:
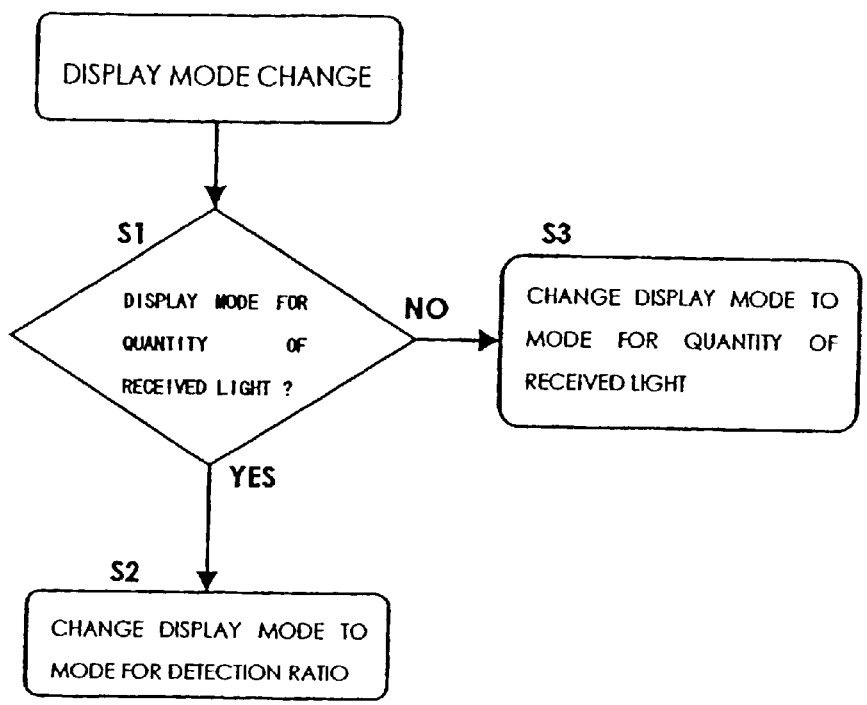
FIG. 5 is a flowchart showing a process for changing the display mode of the second display portion according to the first embodiment of the present invention.
Figure 7:
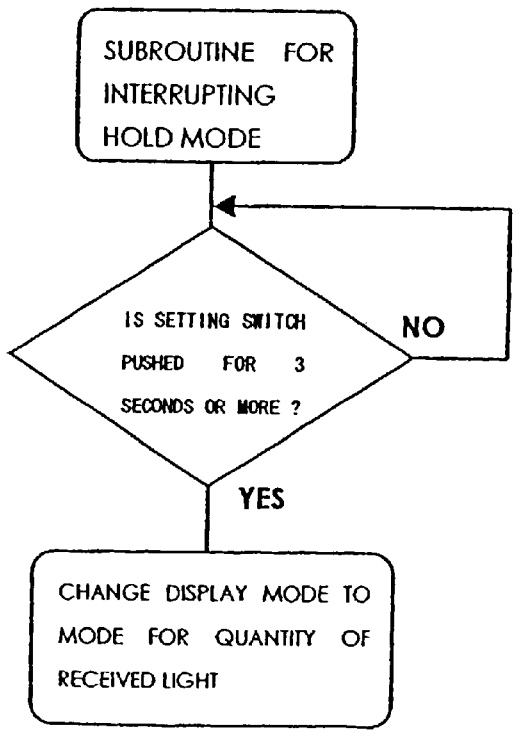
FIG. 7 is a flowchart showing a subroutine procedure that interrupts the main routine described in FIG. 6 in accordance with the first embodiment of the present invention.
Figure 6:
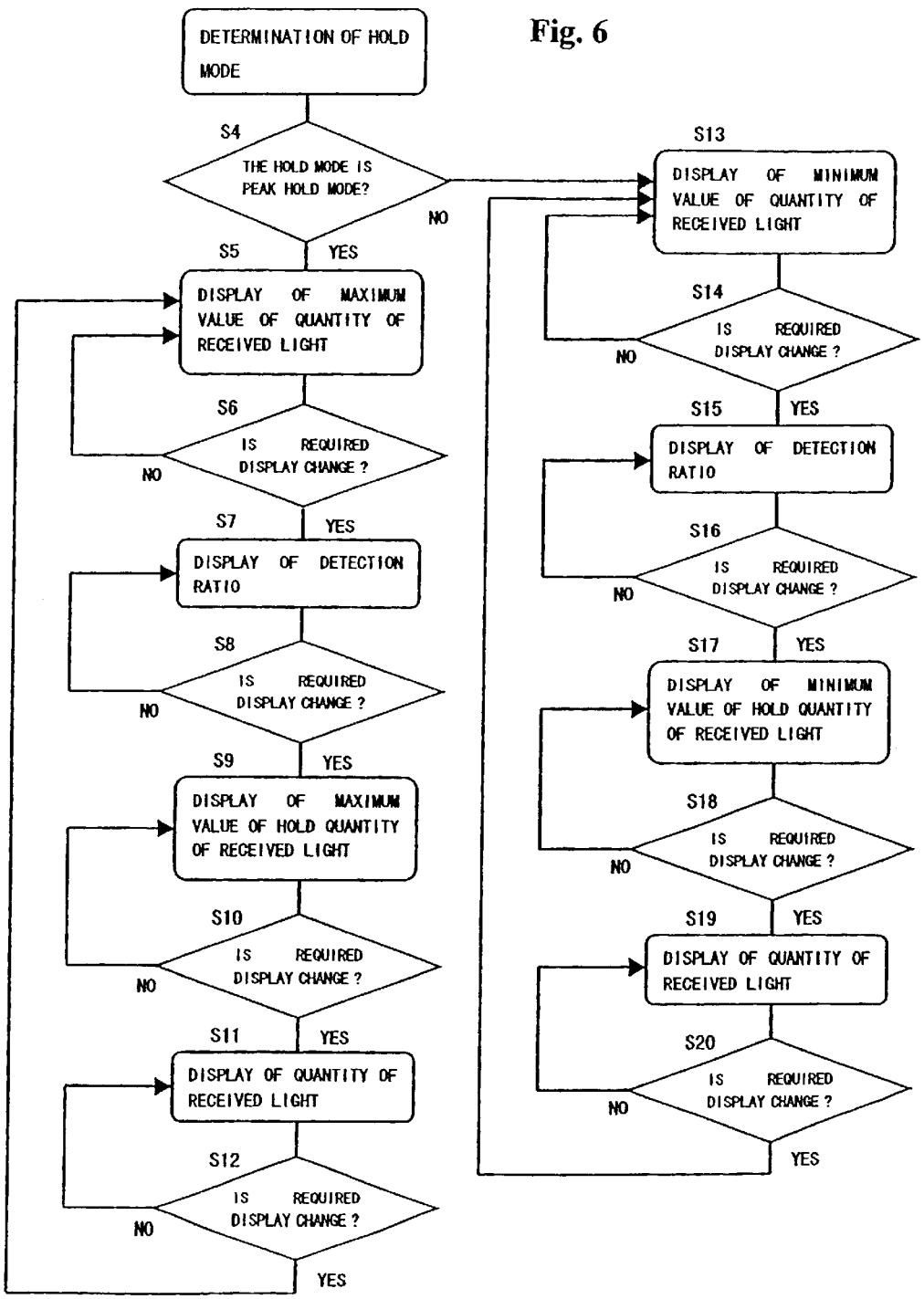
FIG. 6 is a flowchart showing a process for changing the display after the display mode is selected by the setting switch according to the first embodiment of the present invention.

FIGS. 5, 6 and 7 are flowcharts showing the process of changing the display of the second display portion 22 of the main body unit 2.

Using the display select switch 32 and the adjustment switch 28 changes can be made to the displayed item of the second display portion 22.

When the CPU 201 receives inputs from the display select switch 32 and the adjustment switch 32, the CPU 201 cyclically changes the numerals displayed on the second display portion 22 from the numerals corresponding to the input signal LS from the A/D converter 207 indicating the quantity of the received light to: the numerals corresponding to the detection ratio value of the signal LS with respect to the threshold value TH; then to the maximum or minimum value of the quantity of the received light held by the hold mode function; and then to the relative value corresponding to the maximum or minimum value of the detection ratio value with respect to the threshold value TH.

FIG. 5 is a flowchart showing a first mode for changing the display of the second display portion 22 according to the first embodiment of the present invention. The first mode for changing the display is carried out between displaying the quantity of the received light and the detection ratio. Pushing on the display select switch 32 carries out the step of changing the display.

As shown in FIG. 5, at step S1, when the display select switch 32 is pushed, it is determined whether or not the currently displayed numerals correspond to the quantity of received light.

When it is determined that the currently displayed numerals correspond to the quantity of received light at Step S1, the display is changed to display the numerals corresponding to the current detection ratio at Step S2.

On the other hand, when it is determined that the currently displayed numerals do not correspond to the quantity of received light at Step S1, the display is changed to display the numerals corresponding to the quantity of received light at Step S3.

Namely, the display select switch 32 carries out the change of the displayed numerals on the display portion 22 so as to switch between the quantity of received light and the detection ratio.

The hold mode as a second display change mode will be described with respect to FIGS. 6 and 9A–9C. Prior to entering the second display change mode, the first display portion 23 displays the threshold value and the second display portion 22 displays the quantity of the received light or the detection ratio which are selected by the first display change mode.

Figure 9A:
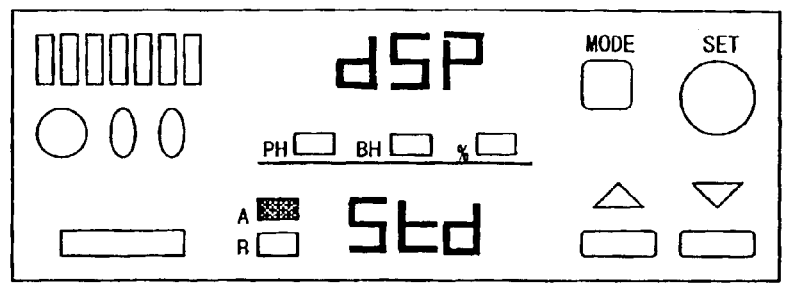
FIG. 9A is a schematic view of a display side surface of the photoelectric sensor illustrating one type of display for the first and second displays according to the present invention.

Then, in this situation, the CPU 201 recognizes the second display change mode when the display select switch 32 is pushed for three seconds or more. Thus the CPU 201 changes the displays of the first and second display portions 23 and 22 as shown in FIG. 9A.

In a detail, the display of the first display portion 23 changes from the displayed threshold value of the first mode to "std". This means an initial condition of the second mode or the no-hold mode condition of the hold mode as the second mode. Also the display of the second display portion 22 changes from the displayed quantity of received light or the displayed detection ratio at the first mode to "dsp". This means the current mode is in the second mode.

Figure 9B:
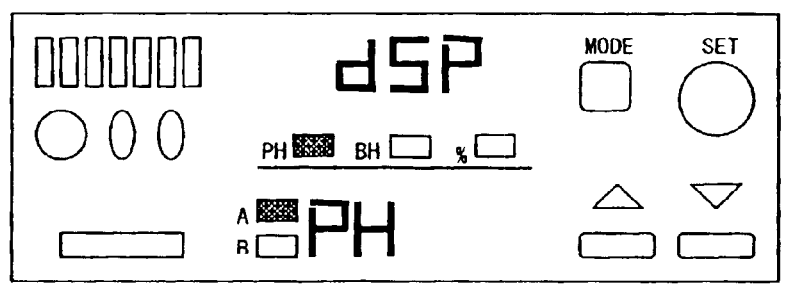
FIG. 9B is a schematic view of a display side surface of the photoelectric sensor illustrating another type of display for the first and second displays according to the present invention.
Figure 9C:
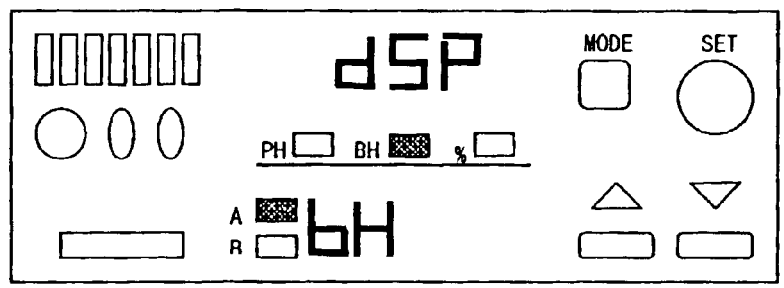
FIG. 9C is a schematic view of a display side surface of the photoelectric sensor illustrating yet another type of display for the first and second displays according to the present invention.

Next, when one of the adjustment switches 28 is pushed with the above-mentioned condition, the displays of the first and second display portions cyclically change to the display shown in FIG. 9B and FIG. 9C. Further, when one of the switches 28 is pushed again, the displays of the first and second display portions change again to the displays shown in FIG. 9A.

In other words, the display of the first display portion 23 cyclically changes between "PH", "bH" and "std" and the display of the second display portion 22 maintains the display "dsp".

The "PH" displayed on the first display portion 23 as shown in FIG. 9B means a peak hold value, in other words, it means the maximum value. The "bH" shown in FIG. 9C means a bottom hold, in other words, it means the minimum value.

Further, "std" shown in FIG. 9A means a standard or a no-hold mode condition.

In other words, the displays of the first and second display portions as shown in FIG. 9A indicate a no-hold mode or an initial condition. The displays of the first and second display portions as shown in FIG. 9B indicate a maximum value display hold mode. Further, the displays of the first and second display portions as shown in FIG. 9C indicate a minimum value display hold mode.

On the other hand, when the other of the adjustment switches 28 is pushed with the above-mentioned condition, the displays of the first and second display portions change to the displays shown in FIGS. 9C and FIG. 9B, in turn. Further, if the other of the switches 28 is pushed again, the displays of the first and second display portions change again to the displays shown in FIG. 9A.

In other words, the display of the first display portion 23 cyclically changes between "bH", "PH" and "std" and the display of the second display portion 22 maintains the display of "dsp".

Then, the operator selects a desired condition from among the maximum and minimum value display hold modes shown in FIGS. 9B and 9C by using the adjustment switch 28.

In detail, after the desired condition is selected by one of the switches 28, the setting switch 29 is pushed to send the mode determination signal to the CPU 201. When the maximum value display mode is selected, the hold mode indicator 27A is turned on at the same time.

On the other hand, when the minimum value display mode is selected, the hold mode indicator 27B is turned on at the same time instead of the indicator 27A.

FIG. 6 is a flowchart showing the changes in the display after the display mode is determined by the setting switch 29 as described above.

The display condition is determined by pushing the setting switch 29 and the flow proceeds to Step S4. At this time, the first display portion 23 displays numerals corresponding to the threshold value TH instead of "PH" or "bH" which is selected and determined by the switches 28 and 29. Further, the second display portion 22 displays numerals corresponding to the selected maximum or minimum value display condition instead of "dsp".

At Step S4, the set mode is evaluated. In detail, when it is determined that the set condition is in the maximum value hold mode which holds the maximum value of the quantity of the received light and displays this value, the flow proceeds to Step S5.

On the other hand, if it is determined in Step S4 that the set condition is in the minimum value hold mode which holds the minimum value of the quantity of the received light and displays this value, the flow proceeds to Step S13.

At Step S5, the second display portion 22 continues to display the numerals corresponding to the maximum value of the quantity of the received light which is renewed at each predetermined term. At the same time, the first display portion 23 displays the current threshold value.

When the display select switch 32 is pushed at Step S5, it is determined that the display select switch 32 was pushed in Step S6. Then, the flow proceeds to Step S7 where the display of the second display portion 22 is changed from the maximum value of the quantity of the received light to the detection ratio of the current quantity of the received light with respect to the threshold value. At this time, the first display portion 23 maintains its display of the current threshold value. On the other hand, when it is determined that the display select switch 32 was not pushed in Step S6 and the flow returns to Step S5 to keep the maximum value of the quantity of the received light as the displayed numerals on the second display portion 22.

When the second display portion 22 displays the detection ratio and if it is determined in Step S8 that the display select switch 32 was pushed, the display of the second display portion 22 is changed from the detection ratio to the maximum value of the detection ratio at each predetermined term in Step S9. At this time, the first display portion 23 maintains its display of the current threshold value. On the other hand, when it is determined that the display select switch 32 was not pushed in Step S8, the flow returns to Step S7 to maintain the detection ratio as the display on the second display portion 22.

When the second display portion 22 displays the maximum value of the detection ratio and it is determined that the display select switch 32 was pushed in Step S10, the display of the second display portion 22 is changed from the maximum value of the detection ratio to the current quantity of the received light at Step S11. At this time, the first display portion 23 maintains its display of the current threshold value. On the other hand, when it is determined that the display select switch 32 was not pushed in Step S10, the flow returns to Step S9 to maintain the maximum value of the detection ratio as the display on the second display portion 22.

When the second display portion 22 displays the current quantity of the received light and if it is determined that the display select switch 32 was pushed in Step S12, the display of the second display portion 22 is changed from the current quantity of the received light to the maximum value of the quantity of the received light in Step S5. At this time, the first display portion 23 maintains its display of the current threshold value. On the other hand, when it is determined that the display select switch 32 was not pushed in Step S12, the flow returns to Step S11 to keep the current quantity of the received light as the display on the second display portion 22.

In other words, the display of the second display portion 22 is cyclically changed from "the maximum value of the quantity of the received light" to "the detection ratio" to "the maximum value of the detection ratio" to "the quantity of the received light" and then back to "the maximum value of the quantity of the received light" in turn by pushing the display select switch 32.

Further, when the step proceeds to Step S13, the second display portion 22 continues to display the minimum value of the quantity of the received light that is renewed at each predetermined term. At the same time, the first display portion 23 displays the current threshold value.

When the display select switch 32 is pushed in Step S13, it is determined whether the display select switch 32 was pushed in Step S14. If so, then the flow proceeds to Step S15. The display of the second display portion 22 is then changed from the minimum value of the quantity of the received light to the detection ratio of the current quantity of the received light with respect to the threshold value. At this time, the first display portion 23 maintains its display of the current threshold value. On the other hand, when the display select switch 32 is not pushed in Step S13, it is determined whether or not the display select switch 32 was pushed in Step S14. If not, the flow returns to Step S13 to keep the minimum value of the quantity of the received light as the display on the second display portion 22.

When the second display portion 22 displays the detection ratio and the display select switch 32 is determined to have been pushed in Step S16, the display of the second display portion 22 is changed from the detection ratio to the minimum value of the detection ratio at each predetermined term in Step S17. At this time, the first display portion 23 maintains its display of the current threshold value. On the other hand, when the display select switch 32 is determined not to have been pushed in Step S16, the flow returns to Step S15 to keep the detection ratio as the display on the second display portion 22.

When the second display portion 22 displays the minimum value of the detection ratio and it is determined that the display select switch 32 was pushed in Step S18, the display of the second display portion 22 is changed from the minimum value of the detection ratio to the current quantity of the received light in Step S19. At this time, the first display portion 23 maintains its display of the current threshold value. On the other hand, when it is determined that the display select switch 32 was not pushed in Step S18, the flow returns to Step S17 to keep the minimum value of the detection ratio as the displayed numerals on the second display portion 22.

When the second display portion 22 displays the current quantity of the received light and the display select switch 32 is determined to have been pushed in Step S20, the display of the second display portion 22 is changed from the current quantity of the received light to the minimum value of the quantity of the received light at Step S13. At this time, the first display portion 23 maintains its display of the current threshold value. On the other hand, when it is determined that the display select switch 32 was not pushed in Step S20, the flow returns to Step S19 to keep the current quantity of the received light as the display on the second display portion 22.

In other words, the display of the second display portion 22 is cyclically changed from "the minimum value of the quantity of the received light" to "the detection ratio" to "the minimum value of the detection ratio" to "the quantity of the received light" and then back to "the minimum value of the quantity of the received light" in turn by pushing the display select switch 32.

FIG. 7 is a flowchart showing a subroutine interrupting the main routine described in FIG. 6 in accordance with the first embodiment of the present invention. When the hold mode is carried out based on the flowchart shown in FIG. 6 and the display select switch 32 is pushed for three seconds or more, the second display portion 22 displays "the current quantity of the received light" and the first display portion 23 displays "the current threshold value".

In other words, when the display select switch 32 is pushed for three seconds or more at any step of the hold mode, the hold mode is shifted to the first mode comprising the first display portion 23 displaying the current threshold value and the second display portion 22 displaying the current quantity of the received light.

Figure 10:
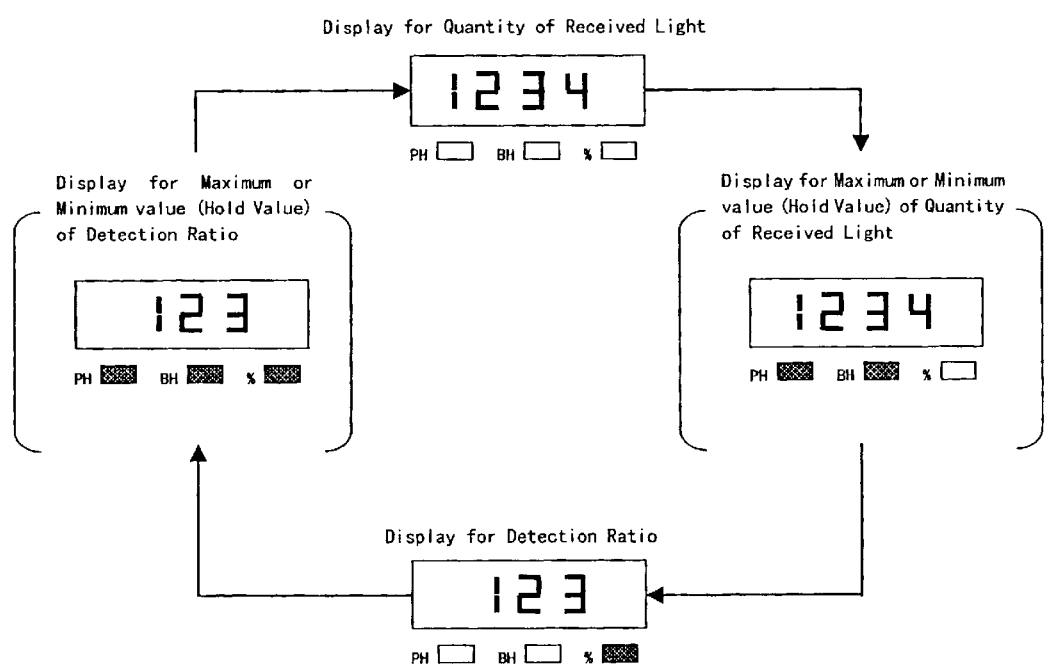
FIG. 10 is a schematic representation of how the second display can change according to the present invention.

FIG. 10 is a schematic representation of how the second display portion can change in accordance with the first embodiment of the present invention.

For example, when the current numerals corresponding to the current quantity of received light is "1234" and the display condition of the second display portion is for the numerals corresponding to the quantity of received light, the second display portion displays "1234" as shown in the upper portion of FIG. 10.

Further, the second display portion has three indicator lights comprising a first indicator light for the peak hold mode (PH), a second indicator light for the bottom hold mode (BH) and a third indicator light for the detection ratio (%)

Therefore, when the second display portion displays "1234" as the current numerals corresponding to the current quantity of received light, all of the three indicator lights are off.

When the display select switch 32 is pushed by the operator, the above mentioned first mode of the second display portion is changed and the second display portion displays "123" as shown in lower portion of FIG. 10.

In this situation, since the second display portion is showing the detection ratio, the third indicator light (%) is turned on.

On the other hand, for the case of the second mode, when the second display portion displays "1234" as the current numerals corresponding to the current quantity of received light as shown in the upper portion of FIG. 10 and the display select switch 32 is pushed, the second display portion displays the maximum or minimum value of the quantity of received light as shown in the right portion of FIG. 10. Also, the respective first or second indicator light corresponding to the selected value is illuminated.

When the display select switch 32 is pushed again, the second display portion numerically displays the detection ratio and turns on the third indicator light.

Additionally, when the display select switch 32 is pushed yet again, the second display portion displays the maximum or minimum value of the detection ratio as shown in the left portion of FIG. 10. Also, the respective first or second indicator light corresponding to the selected value is illuminated while continuing to illuminate the third indicator light.

FIG. 8 is a graph with an abscissa axis indicating time and an ordinate axis indicating the quantity of received light to explain one principle related to the hold mode. The graph shown in FIG. 8 is a schematic graph of the quantity of received light based on time.

As shown in FIG. 8, the quantity of received light from the predetermined detectable area is not constant. This is because the quantity of received light changes based on whether the object 500 is within the detectable area or not.

For example, when the maximum quantity of the received light is detected during one measurement period, a value indicating the maximum value (Maximum 1 in this figure) is stored in a memory installed in the photoelectric sensor. Then the maximum value can be numerically displayed on the second display portion 22.

On the other hand, when the minimum quantity of the received light is detected during one measurement period, a value indicating the minimum value (Minimum 1 in this figure) is stored in the memory installed in the photoelectric sensor. Then the minimum value can be numerically displayed on the second display portion 22.

This process of determining the maximum value and the minimum value is repeated for each measurement period and the maximum and minimum values from the preceding measurement period are used to display during the subsequent measurement period.

In this embodiment, this hold mode function is carried out by using the program installed into the CPU 201 of the main body unit 2. However, this hold mode function can also be carried out by the other hold mode circuit and a hold mode time limit circuit instead of the program installed in the CPU 201.

Further, the predetermined term for holding the maximum value and the minimum value includes a term predetermined by the sensor manufacture and memorized into the CPU 201. This term can be changed based on the request of the operator.

In the first embodiment, the detection ratio is displayed on the detection ratio display portion 12 of the head unit 1. Therefore, even when the main body unit 2 is disposed at a location that is a long distance from the head unit 1, the operator can adjust the position of the head unit 1 by checking the display of the detection ratio display portion 12 of the head unit 1.

Accordingly, the operator can adjust the position of the head unit 1 easily and precisely so it can provide a detection ratio higher than 1 (100%) when the object 500 is within the predetermined detectable area and a detection ratio lower than 1 (100%) when the object is not within the predetermined detectable area.

Therefore, the operational efficiency of the adjustment of the head unit 1 can be improved.

Furthermore, since the detection ratio display portion 12 of the head unit 1 displays the detection ratio, it is easy to confirm whether or not the photoelectric sensor stably detects the object 500 without checking the display portion of the main body unit 2.

Since the detection ratio calculated by the CPU 201 of the main body unit 2 is transferred to the head unit 1 as the variable voltage VA using the power supply voltage of the head unit 1, it is not necessary to add an additional signal line for sending the detection ratio.

In the first embodiment, the detection ratio is expressed by the ratio of the level LV corresponding to the quantity of received light with respect to the threshold value TH.

However, the detection ratio can also be expressed as the difference between the level LV corresponding to the quantity of received light and the threshold value TH.

Further, in the first embodiment, the sensor has the laser diode 102 as the emitting element of the light emitting portion. However, the sensor can use an LED as the emitting element. Furthermore, in the first embodiment, the detection ratio display portion 12 of the head unit 1 uses a bar type of display comprised of a plurality of LEDs 12a, 12b and 12c. However, the detection ratio display portion 12 of the head unit 1 can also use other types of displays that can indicate a numerical value corresponding to the value of the detection ratio.

According to the above-mentioned first embodiment, the photoelectric sensor of the present invention is a reflective type sensor. However, the sensor of the present invention can also be adapted to a thru-beam type sensor. In this case, the head unit comprises a separate light emitting head unit and a separate light receiving head unit.

The light emitting head unit has the laser driving circuit 101 and the laser diode 102. The light receiving head unit has the photo-diode 104, the light receiving circuit 105, the fixed power supply circuit 106, the LED lighting circuit 107 and the detection ratio display portion 12. Further, it is also preferred that the light emitting head unit can have the detection ratio display portion 12.

The sensor of the present invention can also adapt to a photoelectric sensor using the triangulation principle.

Figure 11:
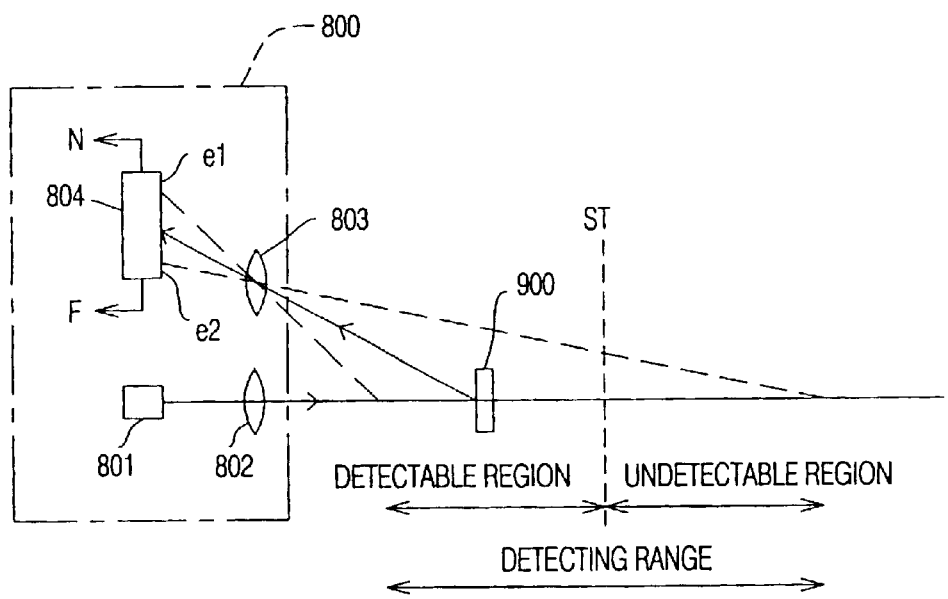
FIG. 11 is a schematic diagram showing the head unit of the photoelectric sensor using a triangulation principle as a second embodiment of the present invention.

FIG. 11 is a schematic diagram showing the head unit of the photoelectric sensor using the triangulation principle as a second embodiment of the present invention.

In FIG. 11, a head unit 800 has a LED 801, a light emitting lens 802, a light receiving lens 803 and a Position Sensing Device (PSD) 804.

The reflected light from the object 900 is received on a receiving light surface of the PSD 804 as a light spot after passing through the light receiving lens 803.

The position of the light spot on the receiving light surface of the PSD 804 is changed based on the distance between the photoelectric sensor 800 and the object 900.

When the object 900 is close to the sensor 800, the light spot is formed on a side e1 of the light receiving surface of the PSD 804. On the other hand, when the object 900 is away from the sensor 800, the light spot is formed at the other side e2 of the light receiving surface of the PSD 804.

The PSD 804 outputs two light receiving signals N and F corresponding to the position of the light spot on the surface of the PSD 804.

The signal N has a level (current value) which is proportional to a distance between the edge portion e1 of the surface of the PSD 804 and the light spot and the other signal F has a level (current value) which is proportional to a distance between the edge portion e2 of the surface of the PSD 804 and the light spot.

Accordingly, the distance between the sensor 800 and the object 900 can be detected by the two signals N and F.

An angle of incidence of the reflected light from the object 900 which can be incident on the light receiving surface of the PSD 804 becomes the detectable area on an optical axis of the emitting light from the LED 801.

A predetermined setting position ST is set within the detecting range and the side closer to the sensor 800 corresponding to the setting position ST becomes the detectable region or area and the side farther from the sensor 800 located past the position ST becomes the undetectable region or area. When the PSD 804 receives the reflected light from the detectable area, the sensor 800 detects the existence of the object 900.

Figure 12A:
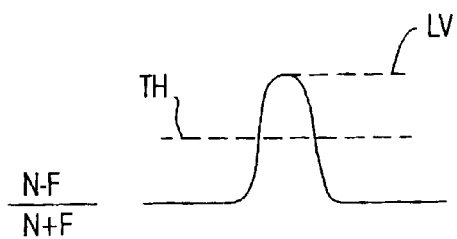
FIGS. 12A and 12B are graphs explaining a determination process by using the signals N and F outputted from a PSD.
Figure 12B:
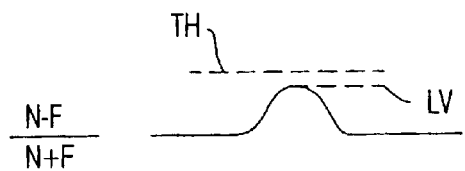

FIGS. 12A and 12B are graphs explaining the process of determining the existence of the object using the signals N and F output from the PSD 804.

The difference between N and F corresponds to the position of the detectable object 900 disposed within the detectable area.

In actual processing, the differences between the position signals (N−F) divided by the sum of the position signal (N+F) corresponds to all of the quantity of received light and gives the position signal {(N−F)/(N+F)}.

This positioning signal becomes the positioning information indicating the position of the object 900 within the detectable area.

As shown in FIG. 12A, when the level LV of the positioning signal is equal to or higher than the predetermined threshold value TH, it is determined that the object 900 is disposed within the detectable area. On the other hand, as shown in FIG. 12B, when the level LV of the positioning signal is lower than the value TH, it is determined that the object 900 is not disposed within the detectable area.

An adjustment of the threshold value TH can move the setting position ST disposed within the detecting range.

In the case of the photoelectric sensor shown in FIG. 11, a ratio of the level LV of the positioning signal with respect to the threshold value TH becomes the detection ratio.

In the case shown in FIG. 12A, the detection ratio indicates a value larger than "1". On the other hand, in the case shown in FIG. 12B, the detection ratio indicates a value smaller than "1".

When the object 900 is disposed far from the setting position ST and is disposed within the detectable region, the detection ratio becomes a value larger than "1".

Further, as stated above, the main body unit of the photoelectric sensor of the present embodiment has the first display portion 23 and the second display portion 22. The second display portion can display the positioning information, the detection ratio, the maximum or minimum values, the threshold value and the maximum or minimum value of the detection ratio selectively.

The first display portion 23 displays the threshold value.

The remaining structures of the sensor of the second embodiment of the present invention are substantially the same as the structures of the sensor described in the first embodiment of the present invention and shown in FIGS. 1 though 4.

The detection ratio display portion of the head unit 800 of the second embodiment displays the detection ratio. Therefore, even when the main body unit is disposed at a long distance from the head unit 800, the operator can adjust the position of the head unit 800 by checking the display of the detection ratio display portion in the head unit 800.

Accordingly, when the object 900 is disposed within the detectable region of the detecting range, the detection ratio becomes larger than "1" and when the object 900 is not disposed within the detectable region, the detection ratio becomes smaller than "1". Therefore, it is easy to precisely adjust the position of the head portion 800. Further, this provides operational efficiency for adjusting the position of the head portion 800.

In these embodiments, the detection ratio can be also expressed by a difference between the level LV of the position signal and the threshold value TH.

In such a case, the detection ratio expresses a displacement of the object 900 relative to the setting position ST.

Figure 13:
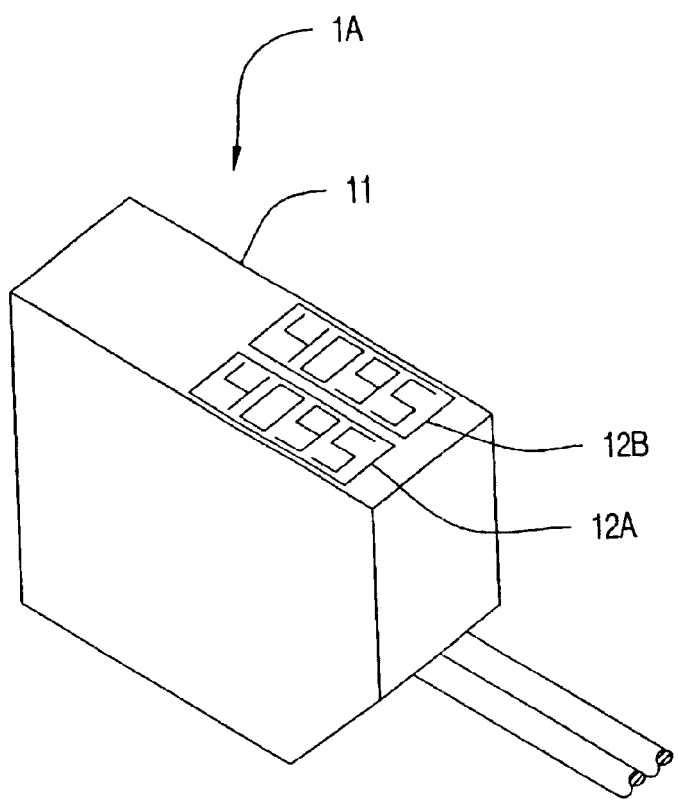
FIG. 13 is a perspective view of a head unit of a photoelectric sensor of the separate type in accordance with a third embodiment of the present invention.

FIG. 13 is a perspective view of a sensor head unit 1A of a photoelectric sensor of a separate type in accordance with a third embodiment of the present invention.

The main body unit (not shown) connected to the sensor head unit 1A shown in FIG. 13 is substantially the same as the main body unit of the sensor shown in FIG. 1.

As shown in FIG. 13, an upper surface of the casing 11 of the head unit 1A has a first additional display portion 12B similarly corresponding to the first display portion 23 of the main body unit 2 and a second additional display portion 12A similarly corresponding to the second display portion 22 of the main body unit 2.

The first additional display portion 12B comprises four digit number display portions each of which comprises seven segments to numerically display the quantity of received light or the detection ratio.

Figure 14:
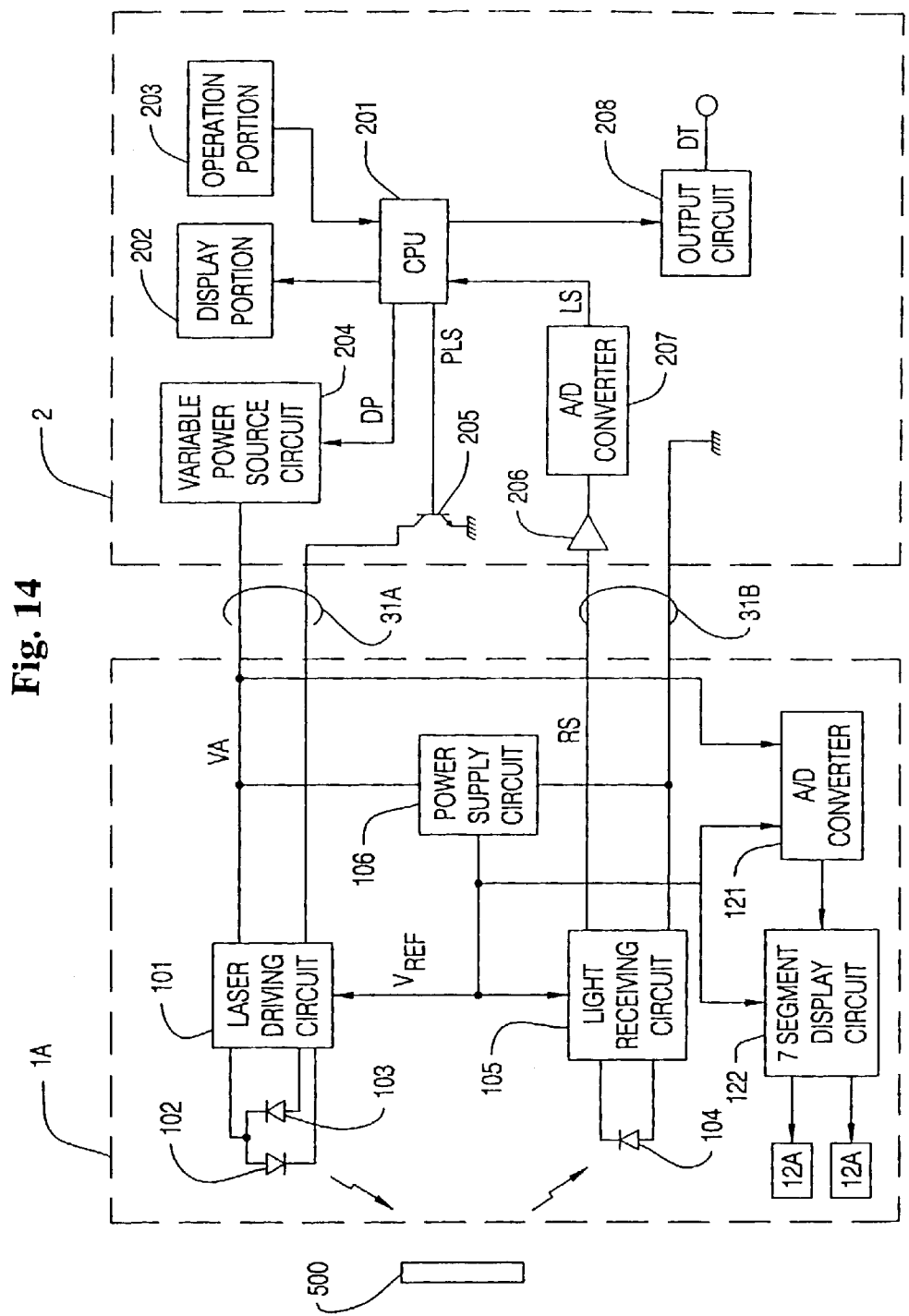
FIG. 14 is a block diagram showing a structure of the separate type photoelectric sensor shown in FIG. 13.

FIG. 14 is a block diagram showing a structure of the separate type photoelectric sensor shown in FIG. 13.

The differences between the sensor shown in FIG. 14 and the sensor shown in FIG. 2 are that the sensor head unit 1A shown in FIG. 14 has an A/D converter 121 and a seven segment display circuit 122 instead of the LED lighting circuit 107 of the sensor shown in FIG. 2.

A variable voltage VA is provided to an A/D converter 121 from a variable power source circuit 204 of the main body unit 2 to the head unit 1a though the cable 31a.

Further, a standard voltage Vref is provided from the fixed power circuit 106 to the A/D converter 121 and the seven segment display circuit 122.

The A/D converter 121 converts the variable voltage VA to a digital signal indicating the detection ratio and the digital signal is provided to the display circuit 122.

The seven segment display circuit 122 displays numerals corresponding to the digital signal on the first additional display portion 12B which comprises four digit number display portions each of which comprises seven segments to display the detection ratio.

In the case of the photoelectric sensor of this embodiment, since the detection ratio calculated by the CPU 201 of the main body unit 2 is transferred to the head unit 1A as the variable voltage VA using the power supply voltage of the head unit 1A, it is not necessary to use an additional signal line for sending the signal indicative of the detection ratio.

In this embodiment, the first additional display portion 12B can selectively display the detection ratio and the quantity of the receiving light.

In this case, it is preferred that the head unit 1A have a select switch to select the display of the first additional display. Further, the second additional display portion 12A can numerically display the threshold value.

Figure 15:
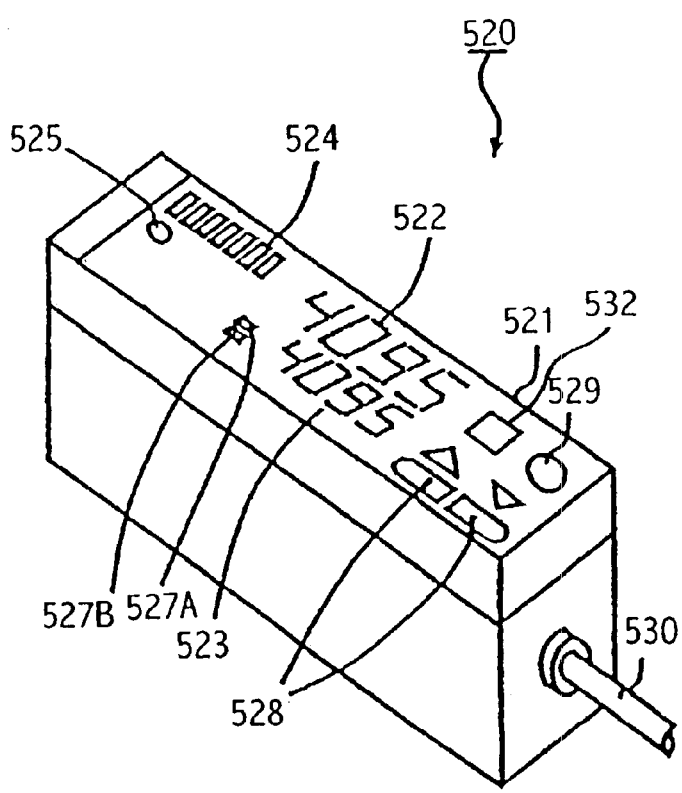
FIG. 15 is a perspective view of a photoelectric sensor comprising an integrated sensor head unit and amplifier unit in accordance with a further embodiment of the present invention.

FIG. 15 discloses an integrated photoelectric sensor 520 according to a further embodiment of the present invention. The sensor 520 includes an upper surface of a casing 521 that has a first display portion 523, a second display portion 522, a bar LED monitor 524, a laser emission indicator 525, hold mode indicators 527A and 527B, an adjustment switch 528, a setting switch 529 and a display select or mode switch 532. The other elements of the sensor head unit 1 discussed in connection with FIG. 1 are also incorporated into the integrated sensor 520. The main difference is that the emitting portion and the receiving portion are incorporated into the sensor 520. The sensor 520 operates in a very similar fashion as that shown in FIG. 1.

Figure 16:
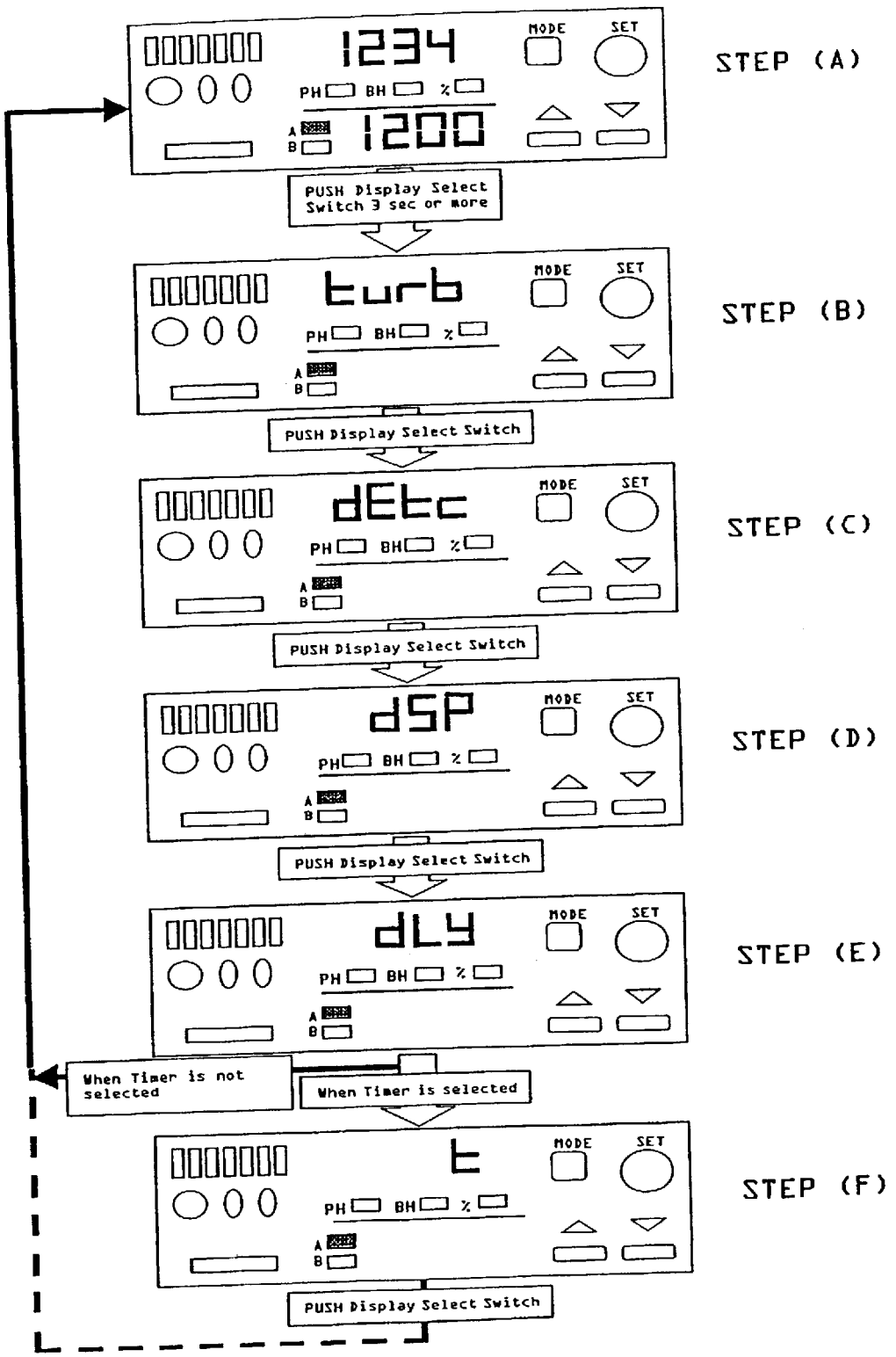
FIG. 16 is a schematic view of a display side surface of the photoelectric sensor illustrating additional display types for the first and second displays according to the present invention.

As shown in FIG. 16, the main body unit 2 of the photoelectric sensor can also display several different types of modes other than those discussed above. These different types of modes include a "Power Setting Mode" for setting the kind of light emitting amount; a "Detection Method Setting Mode" for setting the detection point corresponding to normal detection work, including up edge detection and down edge detection; a "Hold Setting Mode" for setting the maximum value or the minimum value corresponding to the received light amount within every predetermined detection cycle and the detection ratio within every predetermined detection cycle as described above in connection with FIGS. 9A through 9C; and a "Timer Setting Mode" for setting several types of timers.

These modes are cyclically displayed by pushing the display selection switch (also labeled "MODE") as shown in FIG. 16. In detail, when the display selection switch is pushed for three seconds or more, the numeric display shown on the second display portion is changed from "the value indicative of the received light amount" or "the value indicative of the detection ratio" as shown at STEP (A) to "turb" indicating the current mode which is a "Power Setting Mode" as shown at STEP (B). Then, at the same time, the display of the first display portion can also be changed from "the value indicative of the threshold" to "different types of marks indicative of the kind of power mode".

Figure 17:
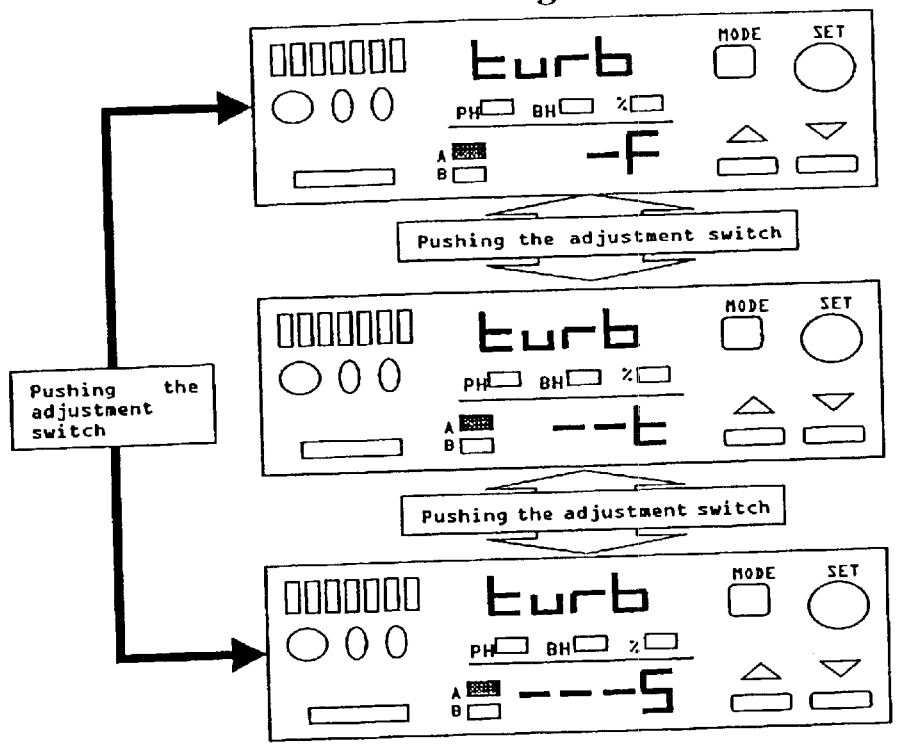
FIG. 17 is a schematic view of a display side surface of the photoelectric sensor illustrating another type of display when switching the power mode according to the present invention.

In detail, as shown in FIG. 17, the power setting mode has three different kinds of power modes, called "FINE", "TURBO" and "SUPER". According to the present embodiment, the "FINE" condition is adapted to detect a target (object) having a high speed of movement in the detectable area and the condition is indicated in the display as "-F" on the first display portion. The "TURBO" condition is used during regular detection work. This "TURBO" condition is indicated by "--t" on the first display portion. Further, the "SUPER" condition is used to detect the target (object) when there is an insufficient light amount. This "SUPER" condition is indicated by "---S" on the first display portion.

When the display enters STEP (B), the first display portion displays "-F" because the sensor is predetermined to display this as an initial display or if other condition like "TURBO" or "SUPER" condition is set previously at this mode, the previous set condition is displayed as the initial display. The operator can then select one desirable condition by using the adjustment switch (UP and DOWN Switch), since pushing the adjustment switch can cyclically change the display of these conditions on the first display portion. Further, since the adjustment switch comprises up and down buttons, the display shown on the first display portion can switch back and forth between "-F" and "--t", "--t" and "---S", and "---S" and "-F".

Then, when the operator selects one of these conditions, pushing the display select switch for less than three seconds completes the setting of the power setting mode. By this action, the power setting mode is shifted to the detection method setting mode as shown in STEP (C) of FIG. 16.

Figure 18:
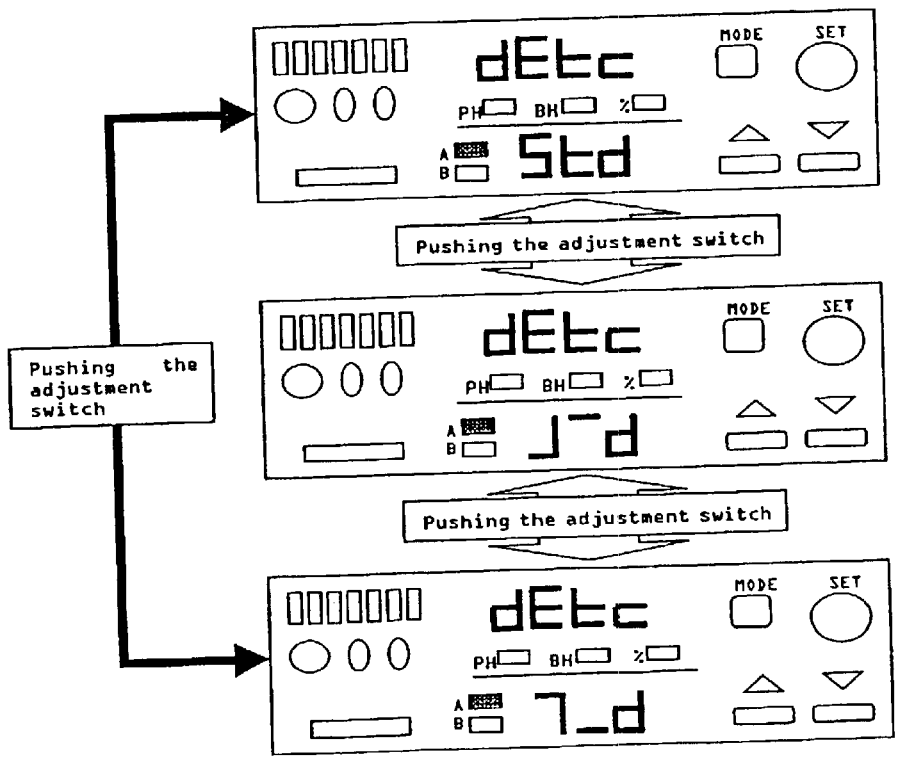
FIG. 18 is a schematic view of a display side surface of the photoelectric sensor illustrating yet another type of display when switching the detection mode according to the present invention.

At that time, as shown in FIG. 18, the display of the second display portion is changed from "turb" to "dEtc" which means "detection". Further, the first display portion displays "std" as an initial setting condition or a previous selected condition similar to that system described above in connection with the power setting mode. The "std" displayed condition is adapted for regular detection work. The "]d" displayed condition is adapted for detecting the edge of upward movement of the received light amount and the "]_d" condition is adapted for detecting the edge of downward movement of the received light amount. The operator then selects one of these desired conditions by using the adjustment switch. Further, since the adjustment switch comprises up and down buttons, the display of the first display portion 23 can move back and forth between the "std" and "]d", "]d" and "]_d" and "]_d" and "std" conditions. Then, when the operator selects one condition, the detection method setting mode is completed by pushing the display select switch for less than three seconds while the desired condition is displayed. Then, by this action the detection method setting mode is shifted to the hold setting mode as shown at STEP (D).

At that time, as shown in FIGS. 9A through 9C, the display of the second display portion is changed from "dEtc" to "dsp". The term "dsp" means "display" and the first display portion displays "std" as an initial setting condition or a previously selected condition similar to that system described above in connection with the power setting mode. The "std" condition is indicated as the "No hold condition". The "PH" condition is adapted to hold a peak value (maximum value) corresponding to at least the received light amount or the detection ratio at every predetermined detection cycle. Further, the "bH" condition is adapted to hold a bottom value (minimum value) corresponding to at least the received light amount or the detection ratio at every predetermined detection cycle. The operator then selects one of the desired conditions by using the adjustment switch 28. Further, since the switch 28 comprises up and down buttons, the display of the first display portion 23 can move back and forth between each of the above-mentioned conditions. *

Then, when the operator selects one of these conditions, pushing the display select switch less than three seconds while the desired condition is displayed completes the hold setting mode. Then, the hold setting mode is shifted to the timer setting mode as shown at STEP (E) of FIG. 16.

Figure 19:
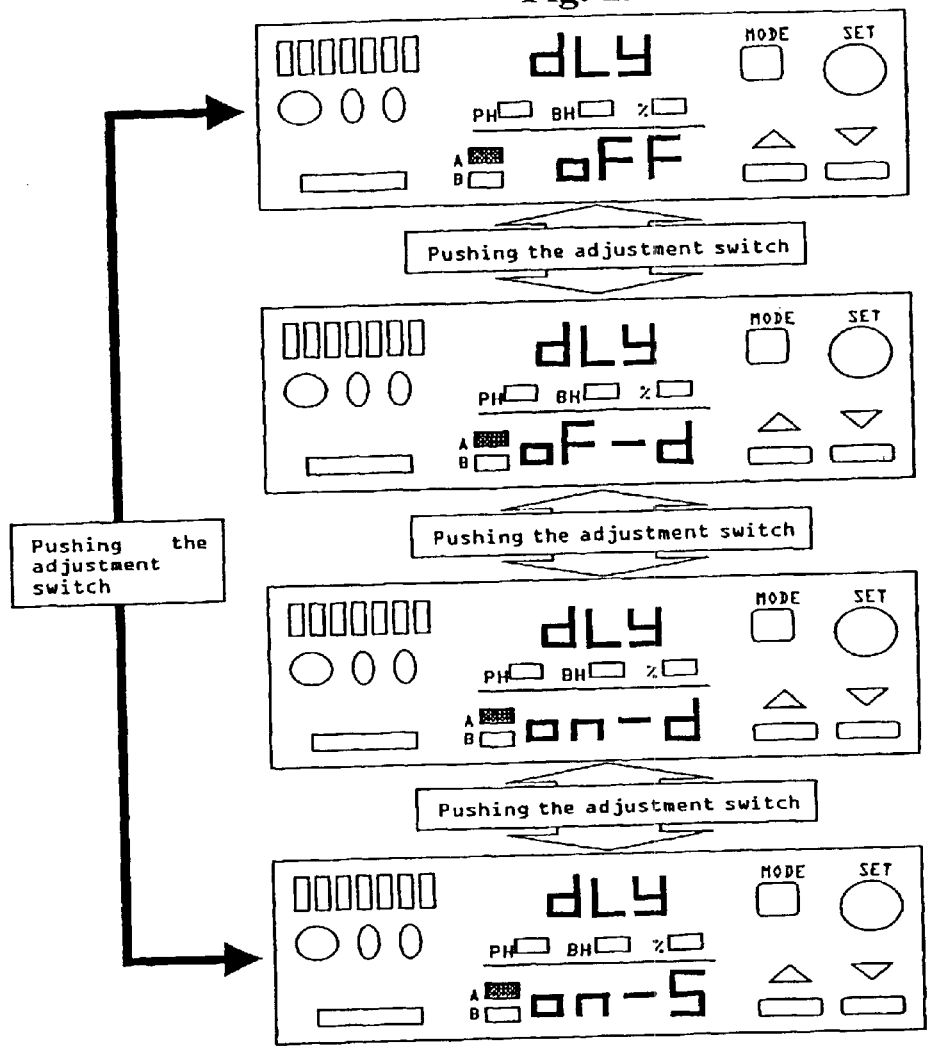
FIG. 19 is a schematic view of a display side surface of the photoelectric sensor illustrating yet another type of display when switching the timer mode according to the present invention.

At that time, as shown in FIG. 19, the display of the second display portion is changed from "dsp" to "dly". The "dly" display means "delay" and the first display portion displays "off" as an initial setting condition or a previous selected condition. The "oFF" condition indicates that the timer function is turned off. In other words, the sensor operates regularly.

The "oF-d" condition means an "off delay timer condition" which is a first timer function. When the sensor detects the received light signal, an "OFF" output signal corresponding to the light detection is output with a delay to an outside machine. The delay is caused by a preset timer for a length that is determined by the operator. How the length of the timer is set will be described below.

Further, the "on-d" condition indicates an "on delay timer condition" and is a second timer function. When the sensor detects the received light signal, an "ON" signal is sent to an outside machine as the output signal corresponding to the detection with a delay that is caused by the preset timer set by the operator.

Furthermore, the "on-S" condition indicates a "one shot timer condition" and is a third timer function. After the sensor detects the received light signal, an "ON" signal is sent to an outside machine. Then an "OFF" signal is subsequently sent to the outside machine with a delay that is caused by the preset timer set by the operator.

The operator then selects one desired condition by using the adjustment switch. Further, since the switch comprises up and down buttons, the display of the first display portion can move back and forth between each of the above-mentioned conditions.

Then, when the operator selects one condition, pushing the display select switch less than three seconds while the desired condition is displayed completes the timer setting mode. If the operator selects the "oFF" condition, meaning of no timer is used, the flow returns to STEP (A) automatically. All of the mode setting functions have then been carried out so all of the set modes are then used and the displays of the first and second display portions return back to their previous conditions.

On the other hand, when the operator selects another timer condition from the "OFF Delay", "ON Delay" and "ONE Shot" conditions, the timer setting mode is shifted to a time setting mode as shown at STEP (F) of FIG. 16.

Figure 20:
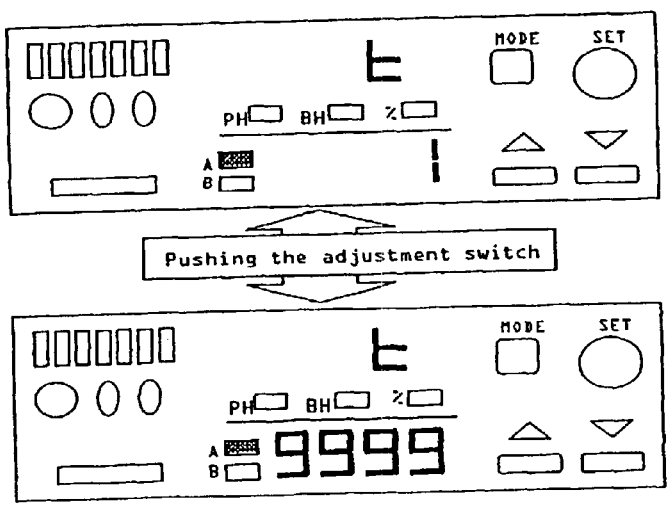
FIG. 20 is a schematic view of a display side surface of the photoelectric sensor illustrating yet another type of display when switching the timer setting according to the present invention.

As shown in FIG. 20, when the timer setting mode is displayed, the second display portion displays "t" indicating "time" and the first display portion displays "1" as an initial setting condition or displays a previously selected number.

According to the present embodiment, since the device can set the timer length between 1 microsecond and 9999 microseconds, the operator displays and sets the desired value by using the adjustment switch. When the delay time setting is completed and the display select switch 32 is pushed for less than three seconds, the flow returns to STEP (A) of FIG. 16 automatically. Then all of the mode setting functions have been carried out so all of the set modes are then used and the displays of the first and second display portions return back to their previous conditions.

According to the above described function modes shown in FIG. 16 through FIG. 20, since each of the first and second display portions 23 and 22 do not have a large number of display segments, the display portions 23 and 22 can display marks, alphabet letters or some combination of several alphabet letters which can be associated with the regular name of the mode that should be set and the regular name of the condition, respectively.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A photoelectric sensor comprising:
   a sensor unit having a casing, said casing including one surface having a first display and a second display, said first and said second displays being a numerical display capable of displaying a plurality of numerical digits, said photoelectric sensor including:
     a first mode for displaying a threshold value that may be set by an operator of said photoelectric sensor on one of said first and said second displays and an amount of light received by said photoelectric sensor on the other of said first and said second displays,
     a second mode for setting conditions corresponding to a plurality of functions provided in said photoelectric sensor and displaying one function selected from a plurality of functions on said first display and one condition selected from a plurality of conditions corresponding to said function displaying on said first display, on said second display,
     a first selection device for changing between the first mode and the second mode,
     a second selection device for shifting the function displayed on said first display to another function during the second mode, and
     a third selection device for selecting one condition to be displayed on said second display, from a plurality of conditions, during the second mode.

2. A photoelectric sensor as defined in claim 1, wherein the second mode includes a power setting mode for selecting one condition from a plurality of different conditions corresponding to at least one of a speed of movement of a target object and an amount of light received from a target object, and displaying the power setting mode on said first display and one condition selected from the plurality of different conditions.

3. A photoelectric sensor as defined in claim 1, wherein the second mode includes a timer setting mode for selecting one condition from different delay conditions and displaying the timer setting mode on said first display and one condition selected from the different delay conditions.

4. A photoelectric sensor as defined in claim 3, wherein the second mode includes a setting time mode for setting a value of delay time corresponding to a delay condition selected in said timer setting mode and displaying said setting time mode on said first display and the value of delay time.

5. A photoelectric sensor as defined in claim 4, wherein when a condition is selected that does not require a timer, the setting time mode is not displayed on said first display.

6. A photoelectric sensor as defined in claim 1, further comprising a fourth selection device for adjusting the threshold value displayed during the first mode.

7. A photoelectric sensor as defined in claim 6, further comprising an adjustment switch including a mechanism disposed on said casing, said adjustment switch including said third and said fourth selection devices.

8. A photoelectric sensor as defined in claim 1, wherein said first and said second displays include elements to display marks and letters.

9. A photoelectric sensor as defined in claim 1, wherein said first and said second displays have seven segment elements.

10. A photoelectric sensor as defined in claim 1, wherein the second mode includes an edge detection method mode for selecting one method from a plurality of different edge detection methods and displaying a selected edge detection method mode on said first display.

11. A photoelectric sensor as defined in claim 1, wherein at least one of said first display and said second display can display a value indicative of a detection ratio, the detection ratio being a ratio of the threshold value and the amount of light received by said photoelectric sensor, and said sensor further includes an additional selection device for changing the display to the value indicative of the detection ratio on at least one of said first and second displays.

12. A photoelectric sensor comprising:
   a sensor unit having a casing, said casing including one surface having a first display and a second display, said first display and said second display being numerical displays capable of displaying a plurality of numerical digits, said photoelectric sensor including:
     a first mode for displaying a threshold value that may be set by an operator of said photoelectric sensor on one of said first and said second displays and an amount of light received by said photoelectric sensor on the other of said first and said second displays,
     a second mode includes a power setting mode and a timer setting mode, wherein the power setting mode selects one condition from a plurality of different conditions corresponding to at least one of a speed of movement of a target object and an amount of light received from a target object and displays the power setting mode on said first display and one condition selected from the plurality of different conditions, and wherein said timer setting mode selects one delay condition from a plurality of different delay conditions and displays the timer mode on said first display and one condition selected from the plurality of different delay conditions, a first selection device for changing between the first mode and the second mode, a second selection device for changing a function displayed on said first display to another function during the second mode, and a third selection device for selecting one condition to be displayed on said second display from a plurality of conditions during the second mode.

13. A photoelectric sensor as defined in claim 12, further comprising a fourth selection device for adjusting the threshold value displayed during the first mode.

14. A photoelectric sensor as defined in claim 13, further comprising an adjustment switch including a mechanism disposed on said casing, said adjustment switch including said third and said fourth selection devices.

15. A photoelectric sensor as defined in claim 12, wherein at least one of said first display and said second display can display a value indicative of a detection ratio, the detection ratio being a ratio of the threshold value and the amount of light received by said photoelectric sensor, and said sensor further includes an additional selection device for changing the display to the value indicative of the detection ratio on at least one of said first and second displays.

16. A photoelectric sensor comprising:

a sensor unit having a casing, said casing including one surface having a first display and a second display, said first and said second displays being a numerical display capable of displaying a plurality of numerical digits, said photoelectric sensor including:

means for displaying a threshold value in a first mode that may be set by an operator of said photoelectric sensor on one of said first and said second displays and an amount of light received by said photoelectric sensor on the other of said first and said second displays, means for setting conditions in a second mode corresponding to a plurality of functions provided in said photoelectric sensor and displaying one function selected from a plurality of functions on said first display and one condition selected from a plurality of conditions corresponding to said function displaying on said first display, on said second display, a first selection device for changing between the first mode and the second mode, a second selection device for shifting the function displayed on said first display to another function during the second mode, and a third selection device for selecting one condition to be displayed on said second display, from a plurality of conditions, during the second mode.

17. A photoelectric sensor comprising:

a sensor unit having a casing, said casing including one surface having a first display and a second display, said first and said second displays being a numerical display capable of displaying a plurality of numerical digits, said photoelectric sensor including:

a control unit including control elements for controlling a display of a threshold value in a first mode that may be set by an operator of said photoelectric sensor on one of said first and said second displays and an amount of light received by said photoelectric sensor on the other of said first and said second displays, said control unit including setting elements for setting conditions in a second mode corresponding to a plurality of functions provided in said photoelectric sensor and controlling the display of one function selected from a plurality of functions on said first display and one condition selected from a plurality of conditions corresponding to said function displaying on said first display, on said second display, a first selection device operatively connected to said control unit for sending a signal to change between the first mode and the second mode, a second selection device operatively connected to said control unit for shifting the function displayed on said first display to another function during the second mode, and a third selection device operatively connected to said control unit for selecting one condition to be displayed on said second display, from a plurality of conditions, during the second mode.

* * * * *